(12) United States Patent
Suzuno

(10) Patent No.: US 8,676,839 B2
(45) Date of Patent: Mar. 18, 2014

(54) INFORMATION PROCESSING DEVICE, CONTRIBUTION INFORMATION EVALUATION SYSTEM, CONTRIBUTION INFORMATION EVALUATION METHOD, AND PROGRAM

(75) Inventor: Satoshi Suzuno, Kanagawa (JP)

(73) Assignee: Sony Corporation, Tokyo (JP)

( * ) Notice: Subject to any disclaimer, the term of this patent is extended or adjusted under 35 U.S.C. 154(b) by 160 days.

(21) Appl. No.: 13/207,755

(22) Filed: Aug. 11, 2011

(65) Prior Publication Data

US 2012/0084298 A1 Apr. 5, 2012

(30) Foreign Application Priority Data

Sep. 30, 2010 (JP) .................. 2010-222862

(51) Int. Cl.
*G06F 7/00* (2006.01)
*G06F 17/30* (2006.01)

(52) U.S. Cl.
USPC ........................................ 707/776

(58) Field of Classification Search
None
See application file for complete search history.

(56) References Cited

U.S. PATENT DOCUMENTS

| 6,701,154 B2* | 3/2004 | Ito .............................. 455/456.1 |
| 7,844,610 B2* | 11/2010 | Hillis et al. .................... 707/740 |
| 8,224,794 B2* | 7/2012 | Rappaport .................... 707/694 |
| 8,402,548 B1* | 3/2013 | Muriello et al. ................. 726/26 |
| 2010/0205430 A1* | 8/2010 | Chiou et al. .................. 713/156 |

FOREIGN PATENT DOCUMENTS

| JP | 2001-290727 | 10/2001 |
| JP | 2007-304977 | 11/2007 |

* cited by examiner

*Primary Examiner* — Taelor Kim
(74) *Attorney, Agent, or Firm* — Oblon, Spivak, McClelland, Maier & Neustadt, L.L.P.

(57) ABSTRACT

An information processing device includes a range of activity information acquisition unit which acquires information of the range of activity that is an area that a user who contributes contribution information on a facility visits, and a reliability level evaluation unit which evaluates the level of reliability for the contribution information based on the information of the range of activity.

8 Claims, 15 Drawing Sheets

FIG. 2

| | | |
|---|---|---|
| TOKYO > HAMAMASTU-CHO TAMACHI SHINAGAWA > SHINAGAWA | | |
| RESTAURANT A | | |

| 💬 REVIEW | | |
|---|---|---|
| EVALUATION | COMMENT | LEVEL OF RELIABILITY |
| ★★★☆☆ | ................ ......... | 5 |
| ★★☆☆☆ | ................ ......... | 4 |
| ★☆☆☆☆ | ................ ......... | 3 |
| ★★★★★ | ................ ......... | 1 |
| ★★★☆☆ | ................ ......... | 5 |

FIG. 3

| TIME | POSITIONAL INFORMATION |
|---|---|
| 9/10/2010 09:40 | 35.658517 , 139.701334 |
| 9/10/2010 09:50 | 35.630152 , 139.740440 |
| 9/10/2010 10:00 | 35.631212 , 139.743648 |
| ⋮ | ⋮ |

INFORMATION PROCESSING DEVICE, CONTRIBUTION INFORMATION EVALUATION SYSTEM, CONTRIBUTION INFORMATION EVALUATION METHOD, AND PROGRAM

BACKGROUND

The present disclosure relates to an information processing device, a contribution information evaluation system, a contribution information evaluation method, and a program, and particularly to an information processing device, a contribution information evaluation system, a contribution information evaluation method, and a program which evaluate reliability of contribution information based on the range of activity of a user.

Along with the development of the Internet, it has become typical for individuals to transmit information through websites or the like. Differing from information transmitted by existing mass media including newspapers, magazines, television and radio broadcastings, and the like, information transmitted by individuals is not provided in return for advertisement fees, and therefore, the information is believed to be highly reliable. For this reason, various kinds of so-called review sites have appeared which provide contribution information by individuals. For example, there are websites which provide contribution information on restaurants, medical clinics, cosmetics, electronic products, movies, and books.

However, as the influence of information transmitted by individuals grows, advertisements have been mingled in such information. It is necessary for users of review sites to judge reliability of contribution information from a large amount of information.

For example, in contribution information on a service that can be offered to users only when they visit a specific place such as a restaurant, positional information of the user who contributes the information can be one of indicators for judging reliability thereof. Thus, Japanese Unexamined Patent Application Publication No. 2007-304977 discloses a contribution information evaluation system which provides evaluation information obtained by evaluating reliability of contribution information posted on a website based on positional information. According to the contribution information evaluation system, reliability of contribution information is provided which is evaluated based on positional information of a client terminal with regard to whether or not the contribution information is posted by a user who actually visited the place.

SUMMARY

However, the contribution information evaluation system in Japanese Unexamined Patent Application Publication No. 2007-304977 simply determines whether or not a visit is paid to the target facility, and does not discriminate contribution information by a user who drops into the facility by chance from contribution information by an individual who goes around the area all the time.

Thus, the present disclosure takes the above problem into consideration, and it is desirable to provide an information processing device, a contribution information evaluation system, a contribution information evaluation method, and a program which are novel and improved and can provide a new evaluation contrivance of contribution information by evaluating reliability of contribution information based on the range of activity of a user who contributes such information.

In order to solve the above problem, according to an embodiment of the present disclosure, there is provided an information processing device including a reliability level evaluation unit for evaluating the reliability level of contribution information based on information of the range of activity that is an area that a user who contributes contribution information on a facility visits.

According to the configuration, the contribution information on a facility located at a specific position can be evaluated based on the range of activity of a contributing user. As described above, information contributed by a user who visits the target facility in their range of activity is considered to be more highly reliable than information contributed by a user who drops into the facility by chance. By evaluating the contribution information based on the range of activity of the contributing user, it is possible to provide a browsing user who browses the contribution information with information whether or not the target contribution information is contributed by a user who visits the area in their range of activity.

In addition, the reliability level evaluation unit may evaluate the level of reliability based on reliability level evaluation conditions that include at least either a time zone designated by a contribution information providing server that provides the contribution information or the distance from the facility.

In addition, the reliability level evaluation unit may evaluate the level of reliability by calculating the number of times that the distance from the position indicating positional information of the user to the facility is within a designated distance in a time zone designated by the reliability level evaluation conditions using the history of the positional information of the user.

In addition, the reliability level evaluation unit may use the information of the range of activity of the user, which is specified in advance, to evaluate the level of reliability based on whether or not the facility is within the range of activity.

In addition, the range of activity may be specified based on information indicating the section of a commuter ticket of the user.

In addition, the reliability level evaluation unit further evaluates the level of reliability based on use history information of e-money or a coupon that the user used in the facility.

In addition, in order to solve the above problem, according to another embodiment of the disclosure, there is provided a contribution information evaluation system including a contribution information providing server which includes a contribution information provision control unit which provides contribution information on a facility, and a terminal device which contributes the contribution information, in which the contribution information provision control unit provides the level of reliability of the contribution information together with the contribution information evaluated based on information of the range of activity that is an area that a user who contributes the contribution information visits.

In addition, in order to solve the above problem, according to still another embodiment of the disclosure, there is provided a contribution information evaluation method which includes evaluating the level of reliability for contribution information based on the information of the range of activity that is an area that a user who contributes contribution information on a facility visits.

In addition, in order to solve the above problem, according to still another embodiment of the disclosure, there is provided a program which causes a computer to function as an information processing device including a reliability level evaluation unit which evaluates the level of reliability for contribution information based on information of the range of activity that is an area that a user who contributes contribution information on a facility visits.

According to present disclosure as described above, it is possible to provide a new evaluation contrivance of contribution information by evaluating reliability of contribution information based on the range of activity of a user who contributes such information.

BRIEF DESCRIPTION OF THE DRAWINGS

FIG. 2 is an illustrative diagram showing an example of a contribution information providing screen;

FIG. 3 is a table showing an example of position log data;

DETAILED DESCRIPTION OF EMBODIMENTS

Figure 1:
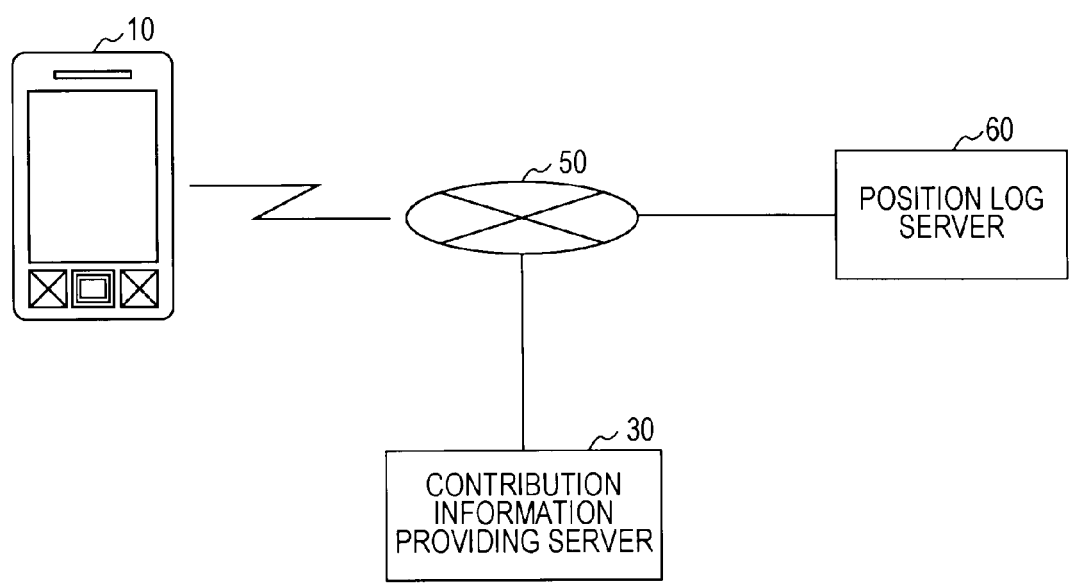
FIG. 1 is a configuration diagram of a contribution information evaluation system according to first and second embodiments of the present disclosure.

Exemplary embodiments of the disclosure will be described in detail below with reference to accompanying drawings. In the present specification and drawings, constituent elements that have practically the same functional configuration will be given with the same reference numerals not to repeat overlapping description thereof.

Description will be provided in the following order.

1. First Embodiment (Example in which evaluation of a level of reliability from position log data is executed for every contribution)

2. Second Embodiment (Example in which range of activity information specified in advance is used)

3. Third Embodiment (Example in which a level of reliability is corrected based on history of e-money use, or the like)

1. First Embodiment

First, the overview of a contribution information evaluation system according to a first embodiment of the present disclosure will be described with reference to FIG. 1. FIG. 1 is a configuration diagram of a contribution information evaluation system according to the first embodiment and a second embodiment.

[System Configuration]

The contribution information evaluation system described herein includes a contribution information providing server 30 which receives contribution information on a facility that offers a service at a predetermined position and provides the information to a user, a user device 10 which contributes the contribution information to the contribution information providing server 30, and a position log server 60 which stores position log data that is the history of positional information of the user device 10. The user device 10, the contribution information providing server 30, and the position log server 60 are connected to one another through a network 50.

Furthermore, in the description below, a user who contributes contribution information is referred to as a contributing user, and a user who reads the contribution information is referred as a browsing user. The title is made based on the role at the time when each operation is performed, and the user may be the same person as an actual user. Furthermore, it is needless to say that the number of the contributing user and the browsing user may be in plural respectively.

The user device 10 is a terminal device that the contributing user possesses, and is an information processing device, for example, a mobile telephone, a notebook PC (personal computer), a portable music player, a portable video processing device, a portable game player, and the like. The user device 10 has a function of contributing review information by accessing a contribution site to which review information regarding a facility is contributed. In addition, the user device 10 has a function of acquiring positional information indicating the current position and periodically transmits the acquired positional information to the position log server 60.

The contribution information providing server 30 is a server managing the above contribution site. The contribution information providing server 30 provides a contribution information providing screen as shown in, for example, FIG. 2. FIG. 2 is an illustrative diagram showing an example of the contribution information providing screen. The contribution information providing screen receives contributions from a plurality of contribution users regarding the facility to provide the browsing user with the contribution and the level of reliability on the contribution information. The level of reliability provided herein is a level of reliability evaluated based on a range of activity of a user. FIG. 2 shows levels of reliability converted to five-stage evaluation values, however it is not limited thereto. Furthermore, the facility set as the target of the review is a facility such as a shop, a park, an amusement park, or the like corresponding to predetermined positional information.

The position log server 60 is a server with a function of storing the history of positional information of the user device 10 as a position log. The position log server 60 has functions of receiving and storing positional information from the user device 10 and providing position log information of a user according to a request from an information processing device such as the user device 10, the contribution information providing server 30, or the like. An example of the position log information stored here is shown in FIG. 3. The position log information includes positional information indicated by latitude and longitude, and the date and time when the positional information is acquired.

[Configuration of User Device]

Figure 4:
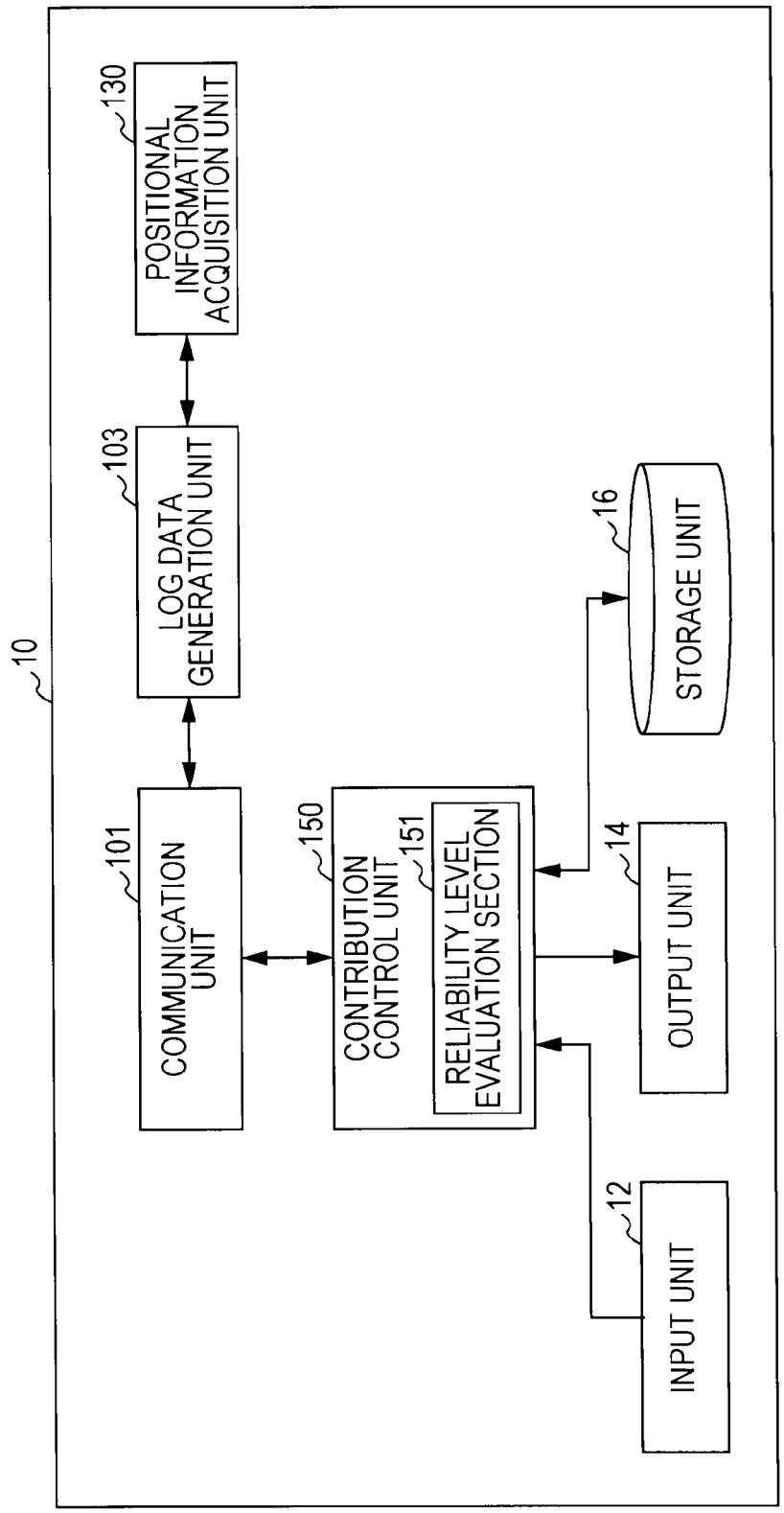
FIG. 4 is a block diagram showing a configuration of a user device according the first embodiment.

Hereinabove, the overview of the contribution information evaluation system is described. Next, a detailed functional configuration of the user device 10 will be described with reference to FIG. 4. The user device 10 mainly includes a communication unit 101, a position log data generation unit 103, a positional information acquisition unit 130, a contribution control unit 150, an input unit 12, an output unit 14, and a storage unit 16.

The communication unit 101 is a communication interface constituted by a communication device, or the like for connecting to the network 50, for example, the Internet or the like. For example, when the communication unit 101 performs wireless communication, the unit may include a communication antenna for transmitting and receiving signals relating to communication, a processing circuit that performs various signal processes relating to communication. In addition, the communication unit 101 may be a communication interface for performing wired communication. The communication unit 101 transmits and receives with the contribution information providing server 30 various data such as contribution information, reliability level evaluation conditions, the level of reliability, and the like through the network 50. In addition, the communication unit 101 transmits and receives various data such as positional information through the network 50 with the position log server 60.

The position log data generation unit 103 controls the positional information acquisition unit 130 to acquire positional information to control the generation of position log data. For example, the position log data generation unit 103 causes the positional information acquisition unit 130 to acquire the positional information at a predetermined interval, and transmits the acquired positional information to the position log server 60 via the communication unit 101.

The positional information acquisition unit 130 has a function of acquiring positional information indicating the current position of the user device 10. The positional information acquisition unit 130 has a function of acquiring positional information based on at least any of a positioning signal from a positioning satellite beginning from, for example, a GPS (Global Positioning System), data detected by various sensors, and the intensity of receiving Wi-Fi waves received from a plurality of base stations and the distance to the base stations. Herein, a configuration in which a positioning signal from the GPS and detection values of various sensors are used will be described using FIG. 3 as an example. Furthermore, when the positional information is acquired based on the intensity of receiving Wi-Fi waves from a base station and the distance thereto, the positional information acquisition unit 130 includes a receiver that receives Wi-Fi waves from a plurality of base stations and a current position calculation unit which presumes the distance between each of the base stations from the intensity of the received Wi-Fi waves and calculates the current position based on the principle of triangulation using the distance between each of the base stations and the position thereof.

Figure 5:
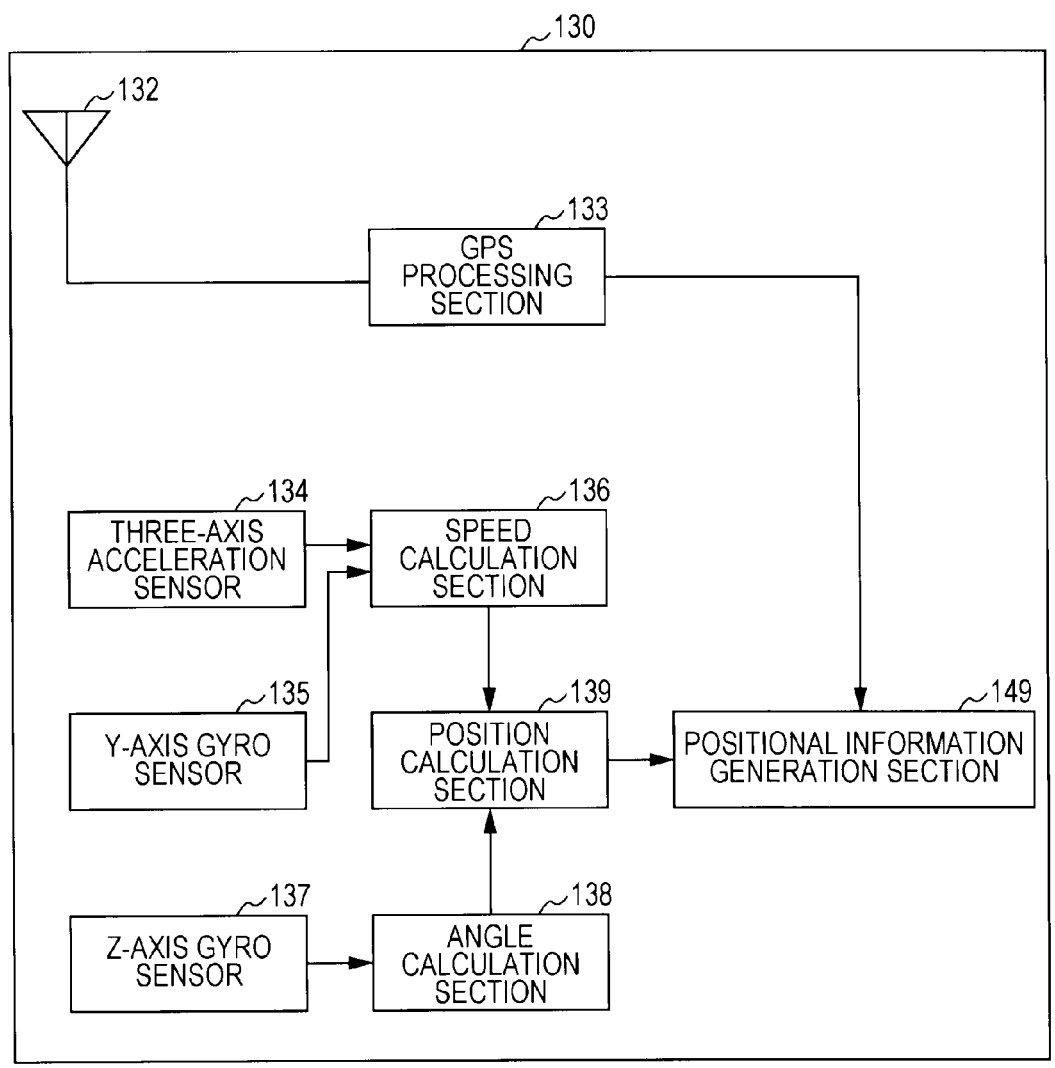
FIG. 5 is a block diagram showing an example of a positional information acquisition unit.

Herein, the detailed configuration of the positional information acquisition unit 130 of the user device 10 will be described with reference to FIG. 5. The positional information acquisition unit 130 mainly includes a GPS antenna 131, a GPS processing section 132, a geomagnetic sensor 133, a three-axis acceleration sensor 134, a Y-axis gyro sensor 135, a Z-axis gyro sensor 136, a pressure sensor 137, a posture angle detection section 138, a direction calculation section 139, a speed calculation section 140, an angle calculation section 141, a position calculation section 142, a height calculation section 143, and a positional information generation section 149.

The GPS antenna 131 can receive GPS signals from a plurality of GPS satellites, and inputs the received GPS signals to the GPS processing section 132. Furthermore, the received GPS signals here include orbit data indicating the orbits of the GPS satellites, information of transmission time of signals, and the like.

The GPS processing section 132 calculates positional information indicating the current position of the user device 10 based on a plurality of GPS signals input from the GPS antenna 131, and supplies the calculated positional information to the positional information generation section 149. Specifically, the GPS processing section 132 calculates the position of each GPS satellite from the orbit data obtained by demodulating each of the plurality of GPS signals, and calculates the distance from each of the GPS satellites to the user device 10 based on the difference between the transmission time and the reception time of the GPS signals. In addition, the three-dimensional current position is calculated based on the calculated position of each of the GPS satellites and the distance from the each of the GPS satellites to the user device 10.

The three-axis acceleration sensor 134 is a sensor with a function of detecting each of an acceleration $\alpha_x$ along the X axis, an acceleration $\alpha_y$ along the Y axis, and an acceleration $\alpha_z$ along the z axis as a voltage value. The three-axis acceleration sensor 134 detects the acceleration $\alpha_x$, $\alpha_y$, and $\alpha_z$ and inputs data indicating the detected acceleration to the posture angle detection unit 138 and the speed calculation section 140.

Furthermore, the Z axis is of the direction corresponding to the vertical direction, the X axis is of the direction corresponding to the traveling direction of the user device 10, and the Y axis is of the direction corresponding to the horizontal direction orthogonal to the X axis.

The Y-axis gyro sensor 135 is a sensor with a function of detecting a pitch rate $\omega_y$ that is an angular speed around the Y axis as a voltage value. The Y-axis gyro sensor 135 detects the pitch rate and inputs data indicating the detected pitch rate to the speed calculation section 140.

The Z-axis gyro sensor 136 is a sensor with a function of detecting a yaw rate $\omega_z$ that is a speed (angular speed) at which a rotation angle around the Z axis changes when the user device 10 circles as a voltage value. The Z-axis gyro sensor 136 detects the yaw rate and inputs data indicating the detected yaw rate to the angle calculation section 141.

The speed calculation section 140 calculates a speed V for the traveling direction by dividing the acceleration $\alpha_z$ along the z axis input from the three-axis acceleration sensor 134 by the pitch rate $\omega_y$ input from the Y-axis gyro sensor 135, and inputs the calculated speed V to the position calculation section 142.

The angle calculation section 141 calculates an angle θ when the user device 10 circles by adding a sampling cycle to the yaw rate $\omega_z$ input from the Z-axis gyro sensor 136, and inputs angle data indicating the angle θ to the position calculation unit 142.

The position calculation section 142 has a function of calculating positional information of the current position based on the speed V calculated by the speed calculation section 140 and the angle θ calculated by the angle calculation section 141. Specifically, the position calculation section 142 obtains the quantity of a change from the position of previous calculation to the current position based on the speed V and the angle θ. In addition, the position calculation section 142 calculates the current positional information from the quantity of the change and the previous position. After that, the position calculation section 142 supplies the positional information of the current position to the positional information generation section 149.

The positional information generation section 149 generates positional information based on at least either absolute positional information supplied from the GPS processing section 132 or relative positional information of the user device 10 supplied from the position calculation section 142 to supply the result to the position log data generation unit 103.

In reference to FIG. 4 again herein, the contribution control unit 150 has a function of controlling contribution of information to a contribution information providing site which provides contribution information on facilities. In the present embodiment, the contribution control unit 150 functions also as a display control unit which controls display of a screen for contribution of information and a reliability level evaluation unit which evaluates the level of reliability of contribution information. The contribution control unit 150 accesses a contribution information providing site according to an operation instruction acquired from the input unit 12 and controls display of the contribution screen. At this time, the contribution information providing site provides the screen for contributing information on a specific facility and shows evaluation conditions of the level of reliability to the user device 10. The contribution control unit 150 evaluates the level of reliability of contribution information that is about to be contributed from the time based on the evaluation conditions of the level of reliability shown on the contribution information providing site. Furthermore, the contribution control unit 150 also functions as a range of activity information acquisition unit which acquires information on the range of activity of the contributing user, which is to be used in evaluating the level of reliability of the contribution information. The contribution control unit 150 transmits the information on the level of reliability and the contribution information to the contribution information providing server 30. Furthermore, details of the evaluation of the level of reliability will be described later.

The input unit 12 receives the operation instruction from the user and inputs the operation instruction to the user device 10. The input unit 12 may be a touch screen integrally provided with the display screen of the output unit 14. Alternatively, the input unit 12 may adopt a physical configuration such as a button, a switch, a lever, or the like, which is provided separately from the display screen. In addition, the input unit 12 may be a signal reception unit which detects a signal which is transmitted from a remote controller and indicates an operation instruction of the user.

The output unit 14 is an output device for providing the user with information through a display screen, audio output, or the like. For example, the output unit 14 has a function as a display unit and an audio output unit. The output unit 14 functioning as the display unit is, for example, a display unit which displays a contribution screen for contributing review information. The output unit 14 may be a display device, for example, a liquid crystal display (LCD), an organic EL (Electroluminescence) display, or the like. Alternatively, the output unit 14 functioning as an audio output unit is an output device which outputs audio data, and may be, for example, a speaker, or the like.

The storage unit 16 is a storage medium which stores programs, and the like which the user device 10 operates. Furthermore, the storage unit 16 may be a storage medium, for example, a non-volatile memory including a flash ROM (or a flash memory), an EEPROM (Electrically Erasable Programmable Read-Only Memory), an EPROM (Erasable Programmable ROM), or the like, a magnetic disk including a hard disk, a disc-shaped magnetic-bodied disk, or the like, an optical disc including a CD (Compact Disc), a DVD-R (Digital Versatile Disc Recordable), and BD (Blu-Ray Disc (registered trademark), an MO (Magneto Optical) disc, or the like.

[Configuration of Contribution Information Providing Server]

Figure 6:
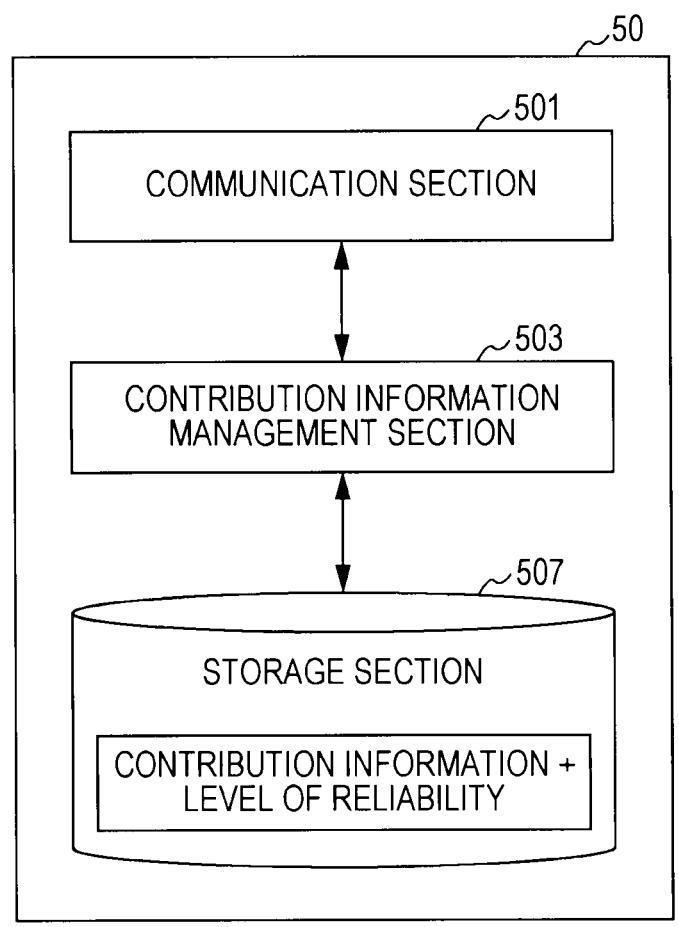
FIG. 6 is a block diagram showing a configuration of a contribution information providing server according to the embodiment.

Next, a configuration of the contribution information providing server 30 will be described with reference to FIG. 6. FIG. 6 is a block diagram showing an example of a configuration of the contribution information providing server. The contribution information providing server 30 mainly includes a communication section 501, a contribution information management section 503, and a storage section 507.

The communication section 501 is a communication interface constituted by a communication device for connecting to the network 50, for example, the Internet. For example, the communication section 501 may be a communication interface including a processing circuit that processes various signals relating to communication. The communication section 501 transmits and receives contribution information, evaluation conditions of the level of reliability, the level of reliability, and the like with the user device 10 through the network.

The contribution information management section 503 has a function of managing contribution information contributed from a plurality of contributing users. The contribution information management section 503 causes the storage section 507 to store the contribution information received by the communication section 501 together with the level of reliability. In addition, the contribution information management section 503 also has a function as a contribution information providing section which provides the contribution information to browsing users according to requests. At this time, the contribution information management section 503 generates a browsing screen to provide the browsing users according to the requests.

The storage section 507 is a storage medium which stores programs for operating the contribution information providing server 30, contribution information, and the like. At this time, the contribution information is stored corresponding to the level of reliability. Furthermore, the storage section 507 may be a storage medium, for example, a non-volatile memory including a flash ROM (or a flash memory), an EEPROM (Electrically Erasable Programmable Read-Only Memory), an EPROM (Erasable Programmable ROM), or the like, a magnetic disk including a hard disk, a disc-shaped magnetic-bodied disk, or the like, an optical disc including a CD (Compact Disc), a DVD-R (Digital Versatile Disc Recordable), and BD (Blu-Ray Disc (registered trademark), an MO (Magneto Optical) disc, or the like.

Hereinabove, examples of the functions of the user device 10 and the contribution information providing server 50 according to the present embodiment have been exemplified. Each constituent element above may be configured using a general-purpose member or circuit, and may be configured by hardware in which a function of each constituent element is specialized. The function of each constituent element may be performed such that an arithmetic unit such as a CPU (Central Processing Unit) reads, interprets, and executes a control program from a storage medium such as a ROM (Read Only Memory) storing the control program in which a processing procedure for realizing the function is described. Therefore, it is possible to appropriately change the configuration to be used according to the technological level each time the present embodiment is implemented.

Furthermore, it is possible to create a computer program for realizing each function of the user device 10 and the contribution information providing server 30 and to load the program on a personal computer, or the like according to the above-described embodiment. In addition, it is possible to provide a recording medium which stores such a computer program and is readable by a computer. The recording medium is, for example, a magnetic disk, an optical disc, a magneto-optical disc, a flash memory, or the like. In addition, the computer program may be transmitted, for example, through a network, without using a recording medium.

[Operation of Contribution Information Evaluation System]

Figure 7:
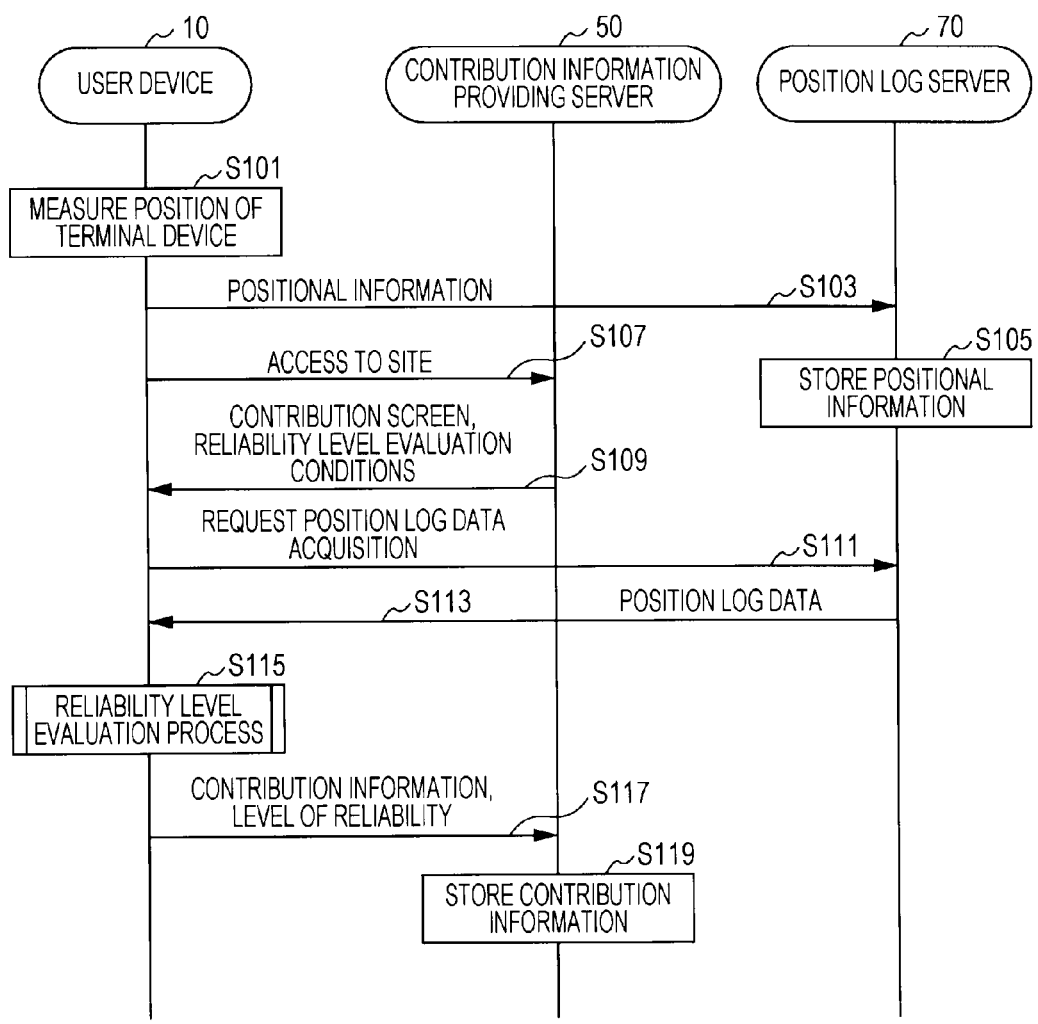
FIG. 7 is a sequence diagram showing an operation of the contribution information evaluation system according to the embodiment.

Next, an operation of the contribution information evaluation system according to the present embodiment will be described with reference to FIG. 7. FIG. 7 is a sequence diagram showing an operation of the contribution information evaluation system according to the present embodiment.

First, the user device 10 measures and acquires the position of its own terminal by the positional information acquisition unit 130 (S101). The user device 10 transmits the acquired positional information to the position log server 60 (S103). The position log server 60 stores the received positional information from the user device 10 to the storage unit (S105).

Herein, it is desirable to periodically perform the process from Step S101 to Step S105. For example, the position log data generation unit 103 may transmit the acquired positional information to the position log server 60 every time the positional information is acquired, and temporarily store the positional information of a predetermined period of time in the storage unit 16 inside the user device 10 and then periodically (for example, on a daily basis) transmit the positional information to the position log server 60. The frequency of transmitting the positional information may be decided based on the balance between network resources and the capacity of a storing medium.

In addition, if the user device 10 accesses a site that provides contribution information (S107), the contribution information management section 503 of the contribution information providing server 30 transmits a contribution screen and evaluation conditions of the level of reliability designated by a contributing user to the user device 10 (S109). The reliability level evaluation section 151 of the user device 10 transmits a positional information acquiring request to the position log server 60 based on the evaluation conditions of the level of reliability (S111). In other words, the reliability level evaluation section 151 at this time transmits a positional information acquiring request for acquiring positional information of a period and time zone designated according to the evaluation conditions designated from the contribution information providing server 30. The position log server 60 transmits the positional information that matches the designated conditions according to the positional information acquiring request (S113). The positional information acquired here is position history information including information of a time the position in the information is measured.

In addition, the user device 10 which acquired the positional information evaluates the level of reliability of the contribution information in the reliability level evaluation section 151 (S115). The evaluation of the level of reliability will be described in detail later. The contribution control unit 150 transmits the level of reliability that is the result of the evaluation and the contribution information to the contribution information providing server 30 (S117). The contribution management section 503 of the contribution information providing server 30 stores the received contribution information in the storage section 507 (S119).

[Reliability Level Evaluation Process]

Figure 8:
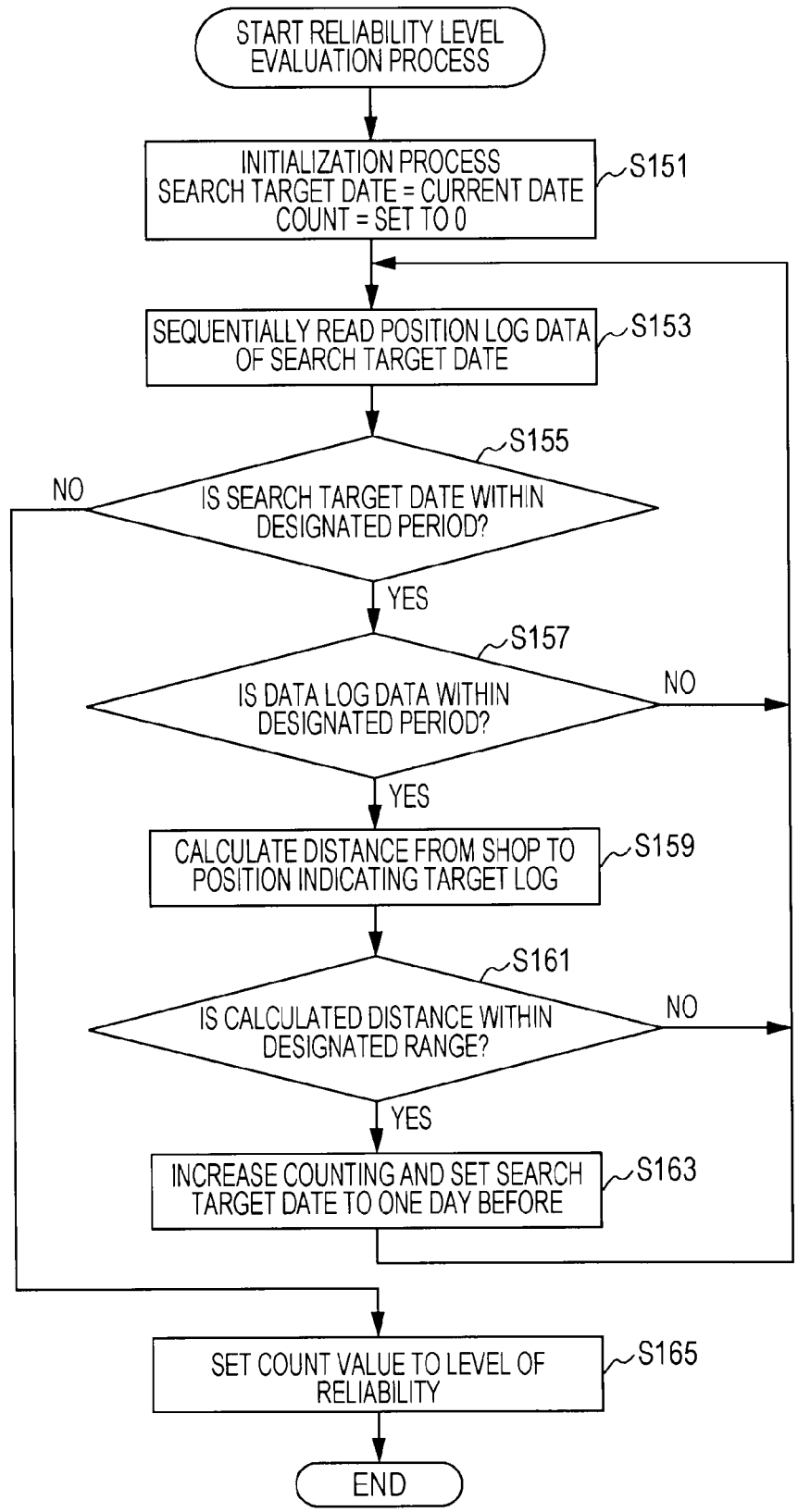
FIG. 8 is a flowchart showing an example of a reliability level evaluation process.

Herein, the reliability level evaluation process for the contribution information shown in Step S115 of FIG. 7 will be described in detail with reference to FIG. 8. FIG. 8 is a flowchart showing an example of the reliability level evaluation process.

First, the reliability level evaluation section 151 performs an initialization process (S151). Specifically, the reliability level evaluation section 151 sets the search target date to the date of the current time and sets 0 for counting. In addition, the reliability level evaluation section 151 sequentially reads position log data of the search target date (S153), and determines whether or not the search target date is within a designated period (S155). Herein, the designated period refers to a period designated by the contribution information providing server 30 as an evaluation condition of the level of reliability, and a period for evaluating the level of reliability. When the administrator of the contribution information providing site wants to highly evaluate the level of reliability of a contributing user who has the range of activity around a facility that is the object of contribution for, for example, the past one year, it is possible to designate the period to one year. In addition, when the administrator of the contribution information providing site wants to highly evaluate the level of reliability of a contributing user who has the range of activity around a facility that is the object of contribution at some time, regardless of a time period, it is possible not to designate a period. In this case, the reliability level evaluation section 151 executes the process of FIG. 8 for all the obtainable periods.

In addition, when it is determined that the search target date is within the designated period in the determination process of Step S155, the reliability level evaluation section 151 then determines whether or not the read log data is data within a designated time (S157). The designated time herein refers to a time designated by the contribution information providing server 30 as an evaluation condition of the level of reliability, and a time in which the level of reliability is to be evaluated. When a contributing user wants to contribute lunch information of a target facility, for example, the administrator of the contribution information providing site can set the designation time to lunch time. Accordingly, it is possible to highly evaluate the level of reliability of contribution information of a contributing user who has the range of activity around the target facility at lunch time.

When it is determined that the log data is not within the designated time in the determination process of Step S157, the reliability level evaluation section 151 returns to Step S153 and reads the next log data of the same search target date. On the other hand, when it is determined that the log data is within the designated time in the determination process of Step S157, the reliability level evaluation section 151 calculates the distance from the position of the shop that is the target facility to the position indicating the log data that is the object at the current time point (S159). Then, the reliability level evaluation section 151 determines whether or not the calculated distance is within a designated range (S161). The designated range can be indicated by, for example, a distance of the radius from the target facility, and is information of the range designated by the contribution information providing site.

When it is determined that a distance from the position indicating the log data from the facility is within the designated range in the determination process of Step S161, the search target date is set to the day before by increasing the count value (S163). When it is determined that the position is not within the designated range in the determination process of Step S161, or after the process of Step S163 is executed, the reliability level evaluation section 151 returns to the process of Step S153. When the process of each step described hitherto is repeated and then it is determined that the search target date is not within the designated period in Step S155, the count value of that time is set to the level of reliability and the reliability level evaluation process ends.

In the contribution information evaluation system according to the first embodiment described hereinabove, the level of reliability of contribution information is evaluated based on the range of activity of a contributing user at the time when the contributing user contributes the information. In the embodiment, it is intended to evaluate the level of reliability in the user device 10, but the disclosure is not limited thereto. For example, the level of reliability may be evaluated in the contribution information providing server 30. In this case, the contribution information providing server 30 can acquire the position log data of a contributing user from the position log server 60 to evaluate the level of reliability. Furthermore, in the embodiment, the position log data of the contributing user is set to be stored in the separate position log server 60, but the disclosure is not limited thereto. The position log data may be stored in the storage unit 16 inside the user device 10.

2. Second Embodiment

Next, a contribution information evaluation system according to a second embodiment of the present disclosure will be described with reference to FIGS. 9 to 13. As described above, the system configuration is the same as that in the first embodiment as previously described using FIG. 1. The contribution information evaluation system according to the present embodiment is different from that in the first embodiment in that the range of activity of a contributing user is specified in advance. Hereinafter, the difference from the first embodiment will be mainly described.

[Configuration of User Device]

Figure 9:
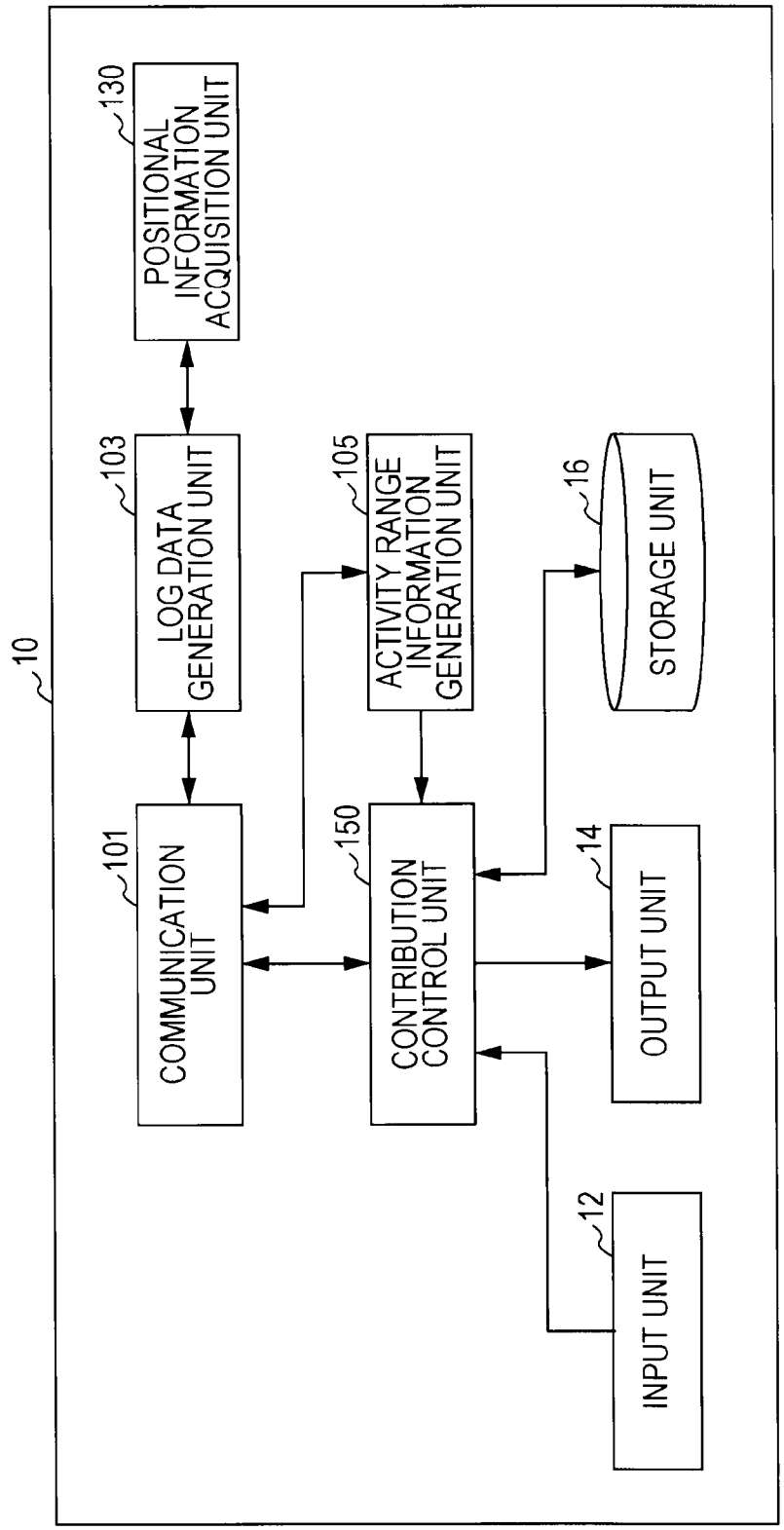
FIG. 9 is a block diagram showing a configuration of a user device according to the second embodiment.

First, a configuration of the user device 10 according to the embodiment will be described with reference to FIG. 9. FIG. 9 is a block diagram showing the configuration of the user device according to the second embodiment of the present disclosure.

The user device 10 according to the embodiment has a function of a range of activity information generation unit 105 in addition to the configuration of the user device 10 according to the first embodiment. In addition, since the level of reliability is evaluated in the contribution information providing server 30, the contribution control unit 150 does not have the function of the reliability level evaluation unit in the embodiment.

The range of activity information generation unit 105 has a function of generating range of activity information. The range of activity information may be information of a range indicated by latitude and longitude, and may be information indicated by the name of a range defined in advance. The range of activity information generation unit 105 specifies the range of activity in advance regardless of the time point when a contributing user contributes information regarding a facility. In addition, it is desirable for the range of activity information generation unit 105 to periodically update the range of activity information. For example, it is possible to update the range of activity information at an interval that the user sets in advance.

[Configuration of Contribution Information Providing Server]

Figure 10:
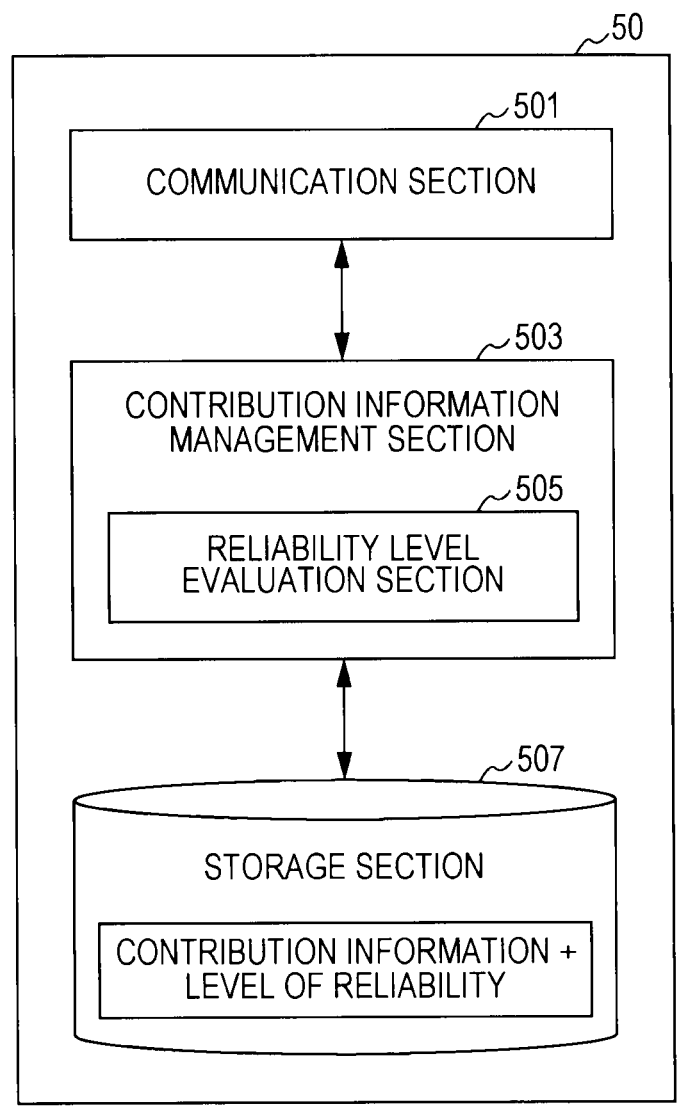
FIG. 10 is a block diagram showing a configuration of a contribution information providing server according to the embodiment.

Next, a configuration of the contribution information providing server 30 according to the present embodiment will be described with reference to FIG. 10. FIG. 10 is a block diagram showing the configuration of the contribution information providing server according to the second embodiment of the present disclosure.

In the embodiment, the contribution information providing server 30 is different in comparison to the contribution information providing server 30 according to the first embodiment in that the contribution information management section 503 has a function of a reliability level evaluation section 505.

The reliability level evaluation section 505 is basically the same as the reliability level evaluation section 151 included in the user device 10 in the first embodiment, but a difference is that the level of reliability of contribution information is evaluated based on range of activity information specified in advance in the present embodiment.

[Operation of Contribution Information Evaluation System]

Figure 11:
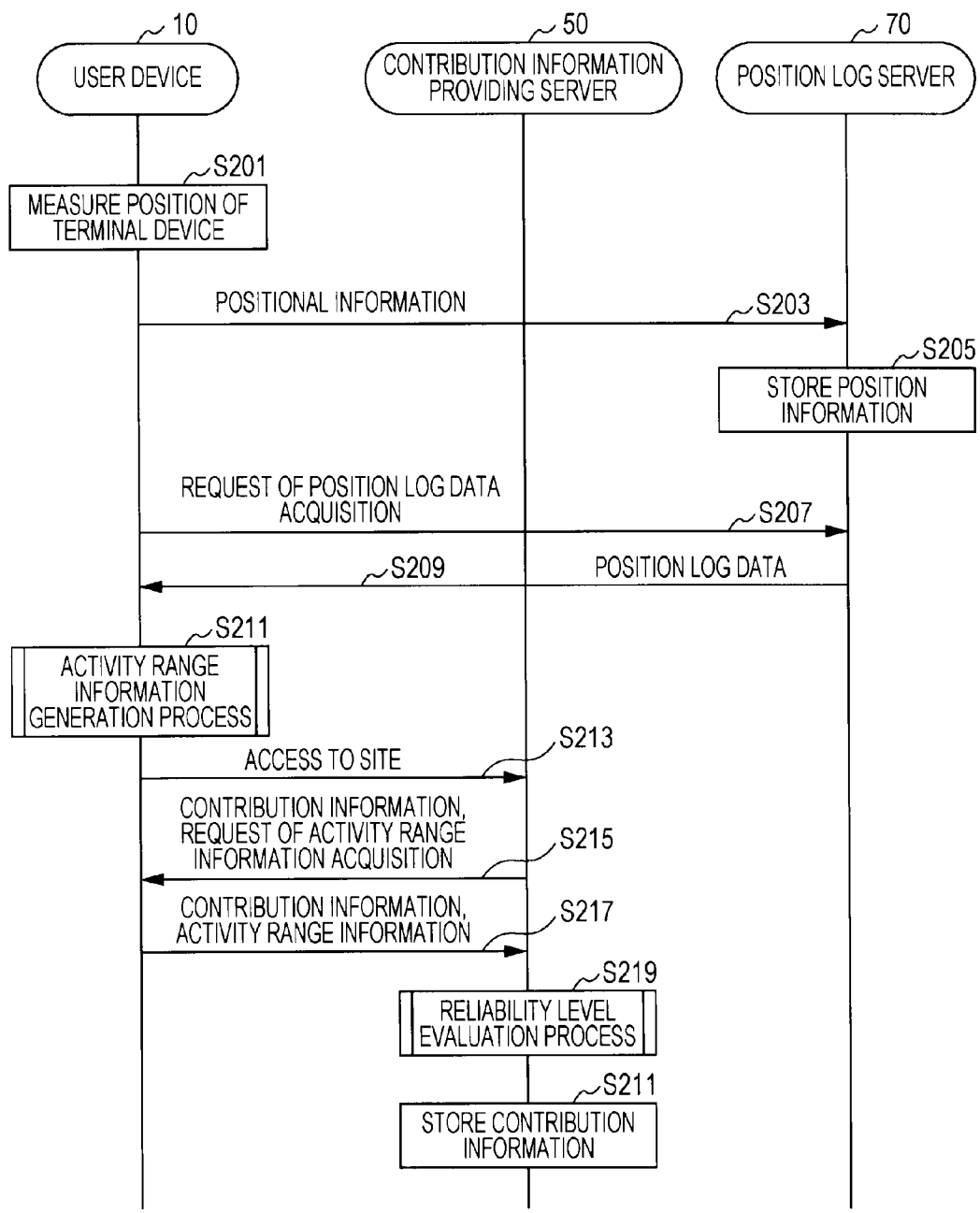
FIG. 11 is a sequence showing an operation of the contribution information evaluation system according to the embodiment.

Next, an operation of the contribution information evaluation system will be described with reference to FIG. 11. FIG. 11 is a sequence diagram showing the operation of the contribution information evaluation system according to the second embodiment of the present disclosure.

Since the process from Steps S201 to S205 is the same as the process from Steps S101 to S105 in FIG. 7, description thereof will not be repeated.

The range of activity information generation unit 105 of the user device 10 transmits a request for acquiring position log data to the position log server 60 when range of activity information is generated (S207). Then, the position log server 60 transmits the position log data according to the request for acquiring the position log data (S209).

In addition, the range of activity information generation unit 105 executes a range of activity information generation process (S211). It is desirable to periodically perform the range of activity information generation process.

In addition, when the contribution control unit 150 accesses a contribution information providing site (S213), the contribution information providing server 30 transmits a contribution screen and a request for acquiring the range of activity information (S215). Accordingly, the contribution control unit 150 transmits contribution information and the range of activity information generated by the range of activity information generation unit 105 to the contribution information providing server 30 (S217).

Then, the contribution information providing server 30 performs evaluation of the level of reliability in the reliability level evaluation section 505 based on the range of activity information of the contributing user. At this time, it is desirable to highly evaluate the level of reliability if the position of a target facility is within the range of activity of the contributing user. The contribution information management section 503 stores the level of reliability and the contribution information in the storage section 507.

[Range of Activity Information Generation Process]

Figure 12:
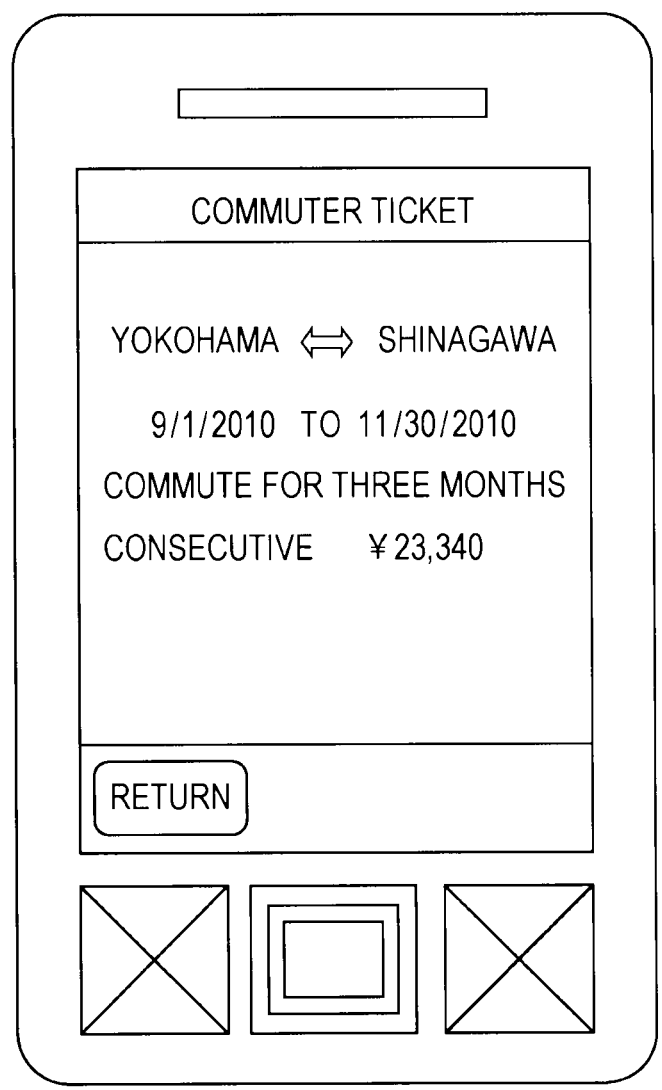
FIG. 12 is an illustrative diagram of an example of commuter ticket information for specifying the range of activity.

Herein, the range of activity information generated by the range of activity information generation unit 105 will be described. For example, when information of a commuter ticket as shown in FIG. 12 is included in the user device 10, the range of activity information generation unit 105 simply sets the boarding location and the disembarkation location as the range of activity. FIG. 12 is an illustrative diagram of an example of the commuter ticket information for specifying the range of activity. In the example of FIG. 12, Yokohama to Shinagawa is the range of activity of the user. Such a commuter ticket is purchased generally based on the range of activity. Normally, a commuter ticket is purchased in many cases for a route from the purchasers' residences to their work places, their schools, or the like. For this reason, it is very likely that the boarding location and the disembarkation location of a commuter ticket is the range of activity of the user. Therefore, the range of activity information generation unit 105 can specify the range of activity simply using such information.

Figure 13:
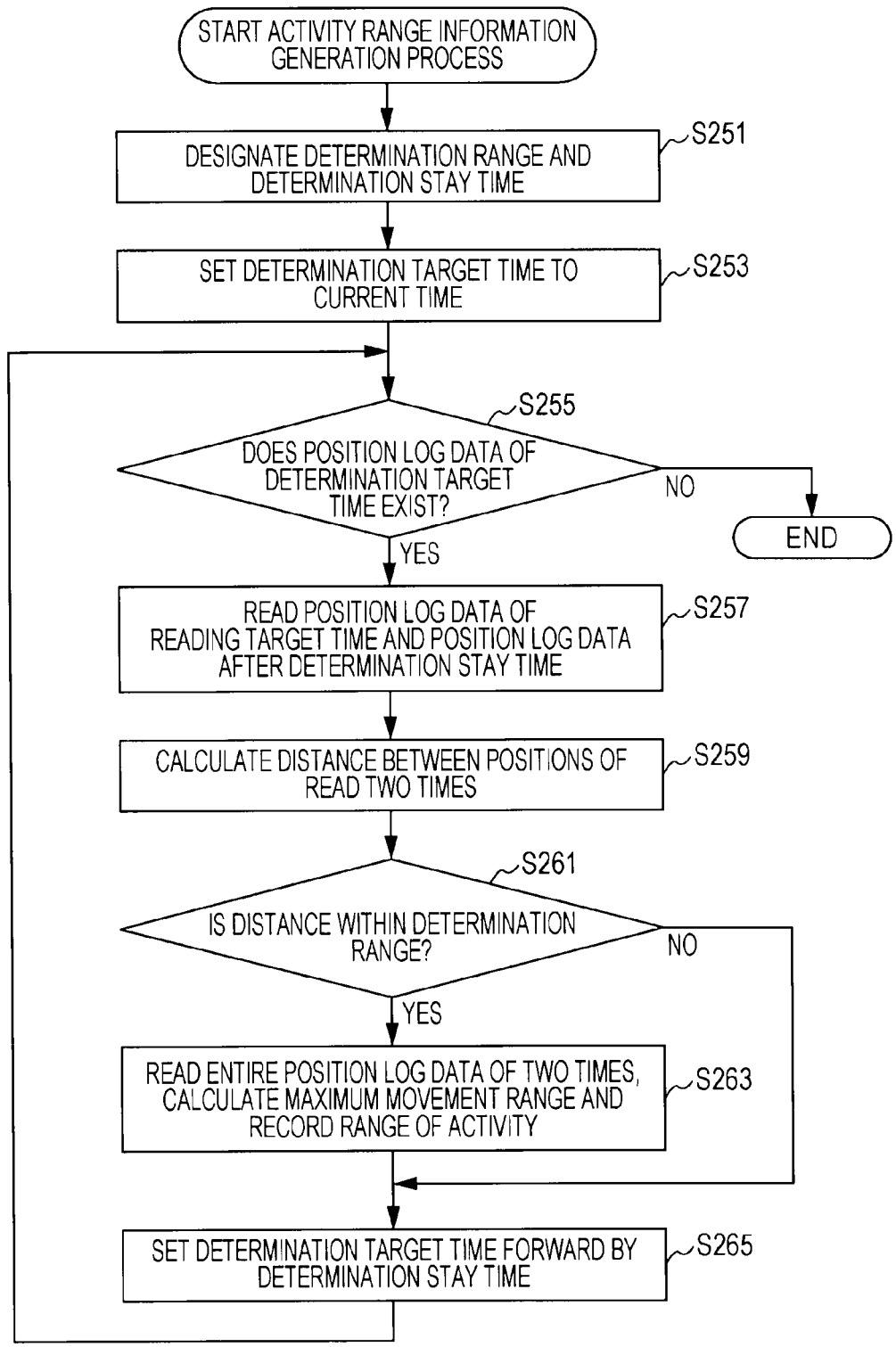
FIG. 13 is a flowchart showing an example of a range of activity information generation process.

Alternatively, the range of activity information generation unit 105 can also generate range of activity information by executing the process shown in FIG. 13. FIG. 13 is a flowchart showing an example of the range of activity information generation process.

First, the range of activity information generation unit 105 designates a determination range and a determination stay time (S251). The determination range and the determination stay time are indicators used for determining the range of activity, and may be set in the system in advance, or may be arbitrarily designated by the user.

Next, the range of activity information generation unit 105 sets the determination target time to the current time (S253). The range of activity information generation unit 105 determines whether or not position log data exists at the determination target time (S255). When the target position log data does not exist, the range of activity information generation process ends.

On the other hand, when it is determined that the position log data exists at the determination target time, the range of activity information generation unit 105 reads position log data at reading target time and position log data after determination stay time (S257). Then, the range of activity information generation unit 105 calculates the distance between the positions of the read two times (S259).

Herein, the range of activity information generation unit 105 determines whether or not the distance calculated in Step S259 is within the determination range (S261). When it is determined that the range is within the determination range in the determination process of Step S261, the entire position log data between the two times is read, and the maximum movement range is calculated to record the range as the range of activity (S263). On the other hand, when it is determined that the range is not within the determination range in the determination process of Step S261, the process of Step S263 is omitted, and the range of activity information generation unit 105 sets the determination target time forward by the determination stay time (S265) and the process returns to the process of Step S255.

As described above, there is an effect that a processing time for information contribution can be shortened by specifying the range of activity of the contributing user in advance. In the first embodiment, it is determined whether or not the range of activity is within a predetermined distance with the target facility as the center, but the present embodiment is preferable when an area set as the range of activity in advance (for example, "Shinagawa", or the like) is compartmentalized, and it is determined whether or not the range of activity is within the area.

3. Third Embodiment

Next, a third embodiment of the present disclosure will be described with reference to FIGS. 14 to 16. The present embodiment is executed in addition to the process of the first or the second embodiment, and the history of e-money use is added to the indicator for evaluating the level of reliability, in addition to the range of activity.

[Configuration of Contribution Information Evaluation System]

Figure 14:
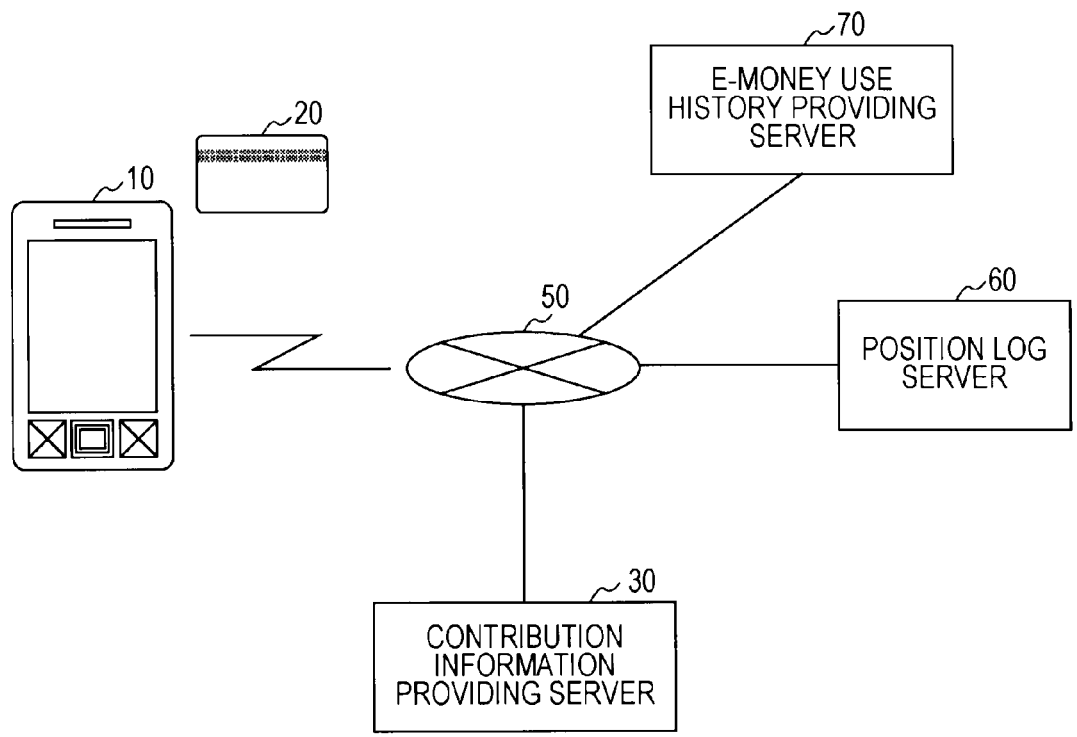
FIG. 14 is a configuration diagram of a contribution information evaluation system according to a third embodiment.

FIG. 14 is a configuration diagram of a contribution information evaluation system according to the third embodiment of the disclosure. In the embodiment, the contribution information evaluation system includes the user device 10, an e-money card that a contributing user who is the owner of the user device 10 possesses, the contribution information providing server 30, the position log server 60, and an e-money use history providing server 70, and each of the devices is connected to one another through the network 50.

When it comes to the comparison between the first and the second embodiment, the contribution information evaluation system according to the embodiment is different in that the e-money use history providing server 70 is included therein. Furthermore, the e-money use history providing server 70 is not used when the user device 10 retains the history of e-money use.

The e-money use history providing server 70 is a device for providing information of the history of e-money use. The information of the use history includes, for example, information of user identification, the amount that the user paid, the facility that the user visited, the time that the user used the facility, and the like.

[Reliability Level Addition Process]

Herein, a reliability level addition process described next is executed by the reliability level evaluation section 151 and the reliability level evaluation section 505. Hereinbelow, description is provided on the process of the reliability level evaluation section 151, but it is possible to set the process by the reliability level evaluation section 505 according to the configuration.

First, the reliability level evaluation section 151 performs an initialization process (S301). Specifically, the reliability level evaluation section 151 sets the search target date to the date of the current time and sets 0 for counting. Next, the reliability level evaluation section 151 sequentially reads position log data of the search target date (S303).

Then, the reliability level evaluation section 151 determines whether or not the search target date is within a designated period (S305), and when the date is determined to be within the designated period, it is determined whether or not the date is log data within the time designated next (S307). The period and time zone designated here is a period and time zone designated by the contribution information providing server 30. Then, when the date is determined to be log data within the designated time in the determination process of Step S307, then the reliability level evaluation section 151 calculates the distance from the target shop to the position indicating the target log (S309).

Then, the reliability level evaluation section 151 determines whether or not the calculated distance is within the designated range (S311). When it is determined to be within the designated range in the determination process of Step S311, the reliability level evaluation section 151 executes the e-money use history acquisition process (S313). If the e-money use history is acquired in Step S313, the reliability level evaluation section 151 determines whether or not the time zone of the e-money use history and the time of the position log data coincide with each other (S315).

When they are determined to coincide with each other in the determination process of Step S315, the search target date is set to the day before by increasing the count value (S317). After that, the reliability level evaluation section 151 returns to the process of Step S303. After repeating the process, if the search target date is determined to not be within the designated period in Step S305, the reliability level evaluation section 151 adds the count number at that time to the level of reliability (S319).

With the above process, it is possible to add the level of reliability based on the history of e-money use when the contributing user actually visits the target facility, whereby it is possible to more accurately evaluate the level of reliability of contribution information.

Figure 15:
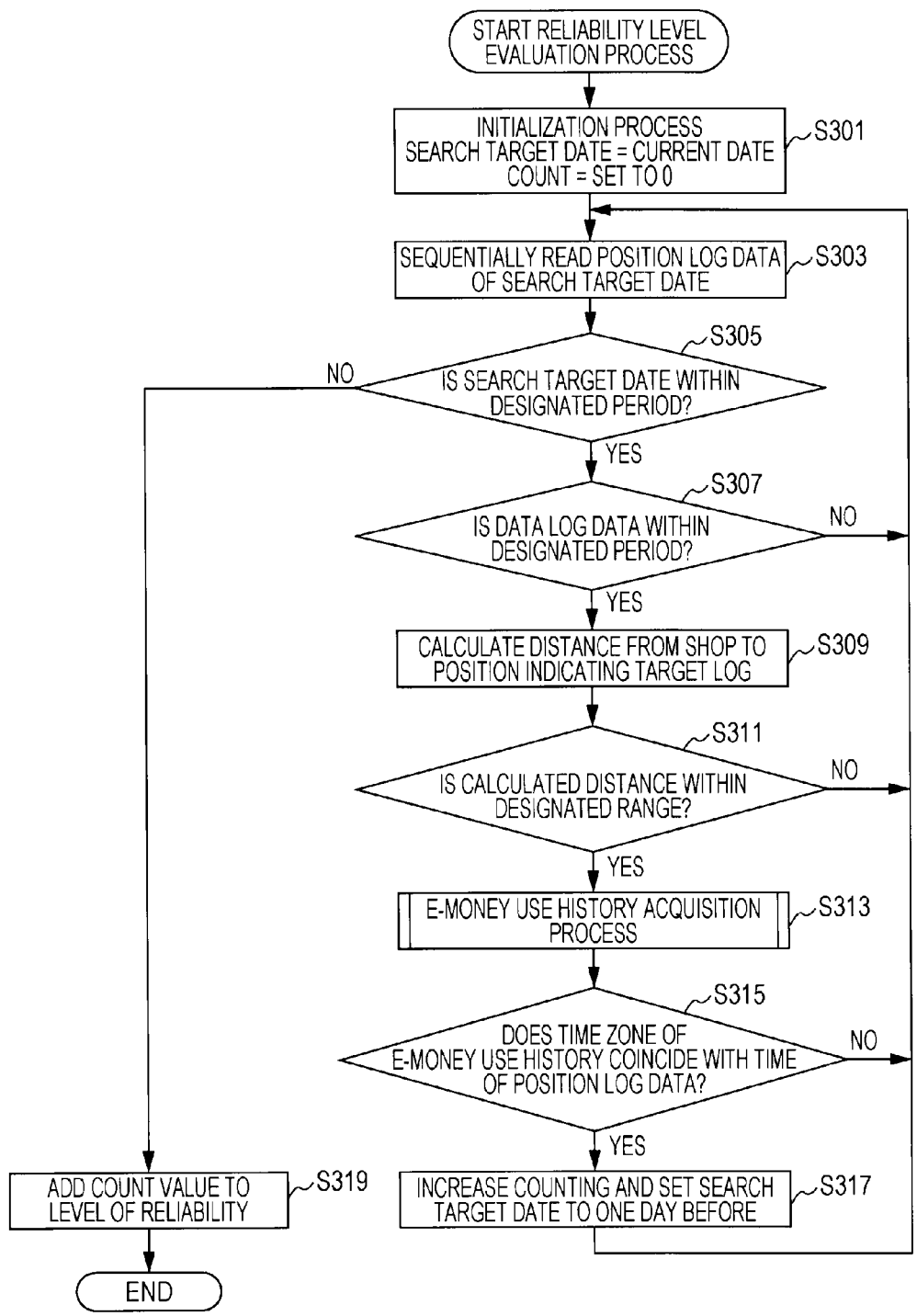
FIG. 15 is a flowchart showing an example of a reliability level addition process.
Figure 16:
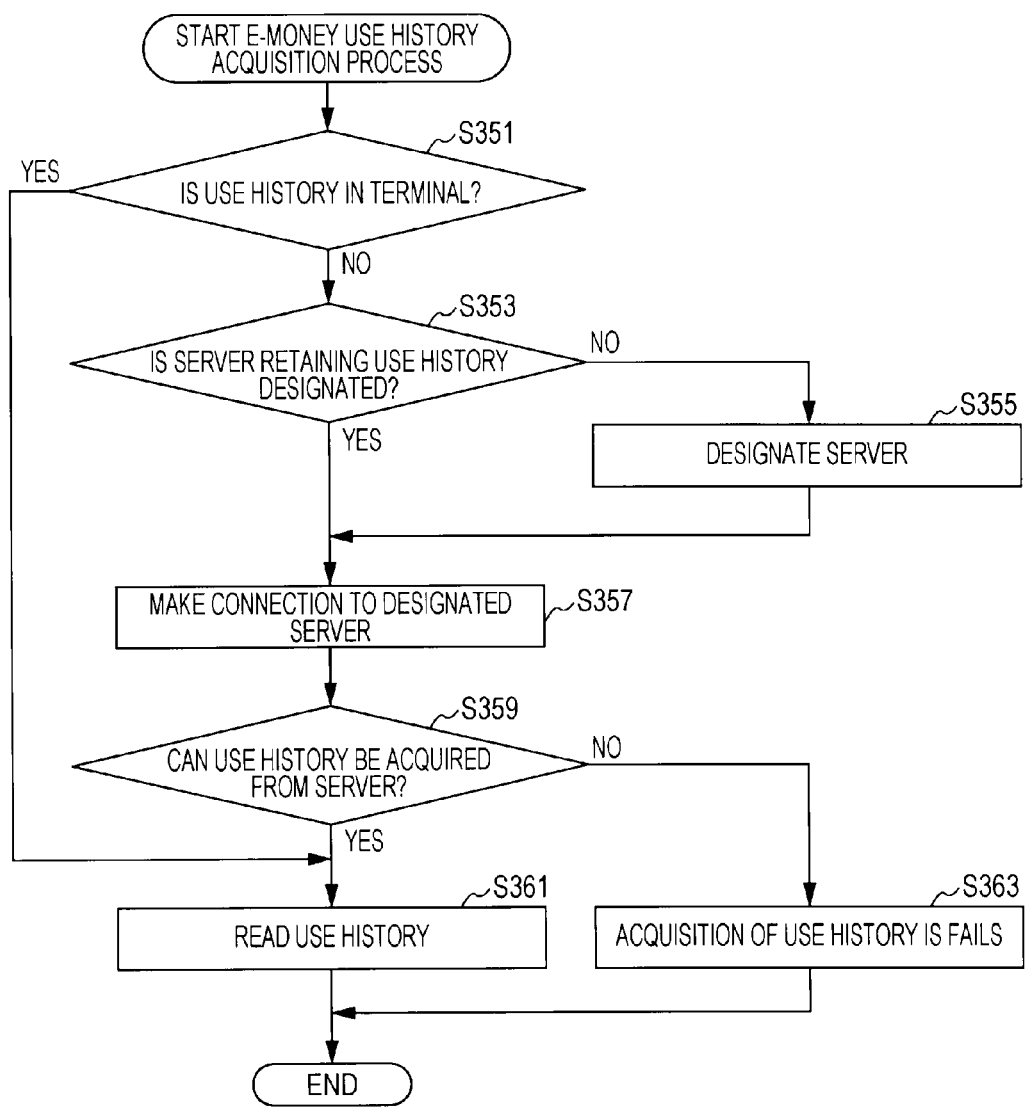
FIG. 16 is a flowchart showing an example of an e-money use history acquisition process.

The details of the e-money use history acquisition process of Step S313 in FIG. 15 are as shown in FIG. 16.

First, the reliability level evaluation section 151 determines whether or not the use history is in the terminal of the user device 10 (S351). Then, when the use history is in the terminal, the use history is read (S361), and the process ends.

On the other hand, when the use history is not in the terminal, next, the reliability level evaluation section 151 determines whether or not a server that retains the use history is designated (S353). Herein, when a server that retains the use history is not designated, a server is designated (S355), and connection to the designated server is made (S357). The designation of the server in Step S355 may be performed in compliance with designation of the user.

Next, the reliability level evaluation section 151 determines whether or not the use history can be acquired from the connected server (S359), and when it can be acquired, the reliability level evaluation section 151 reads the use history acquired from the server (S361). On the other hand, when it is not possible to acquire the use history from the server, the acquisition of the use history fails (S363), and the process ends.

Hereinabove, exemplary embodiments of the disclosure have been described in detail with reference to accompanying drawings, but the disclosure is not limited thereto. It is obvious that a person who has general knowledge in the field to which the disclosure belongs can attain various types of modified examples or amended examples in the scope of the technical idea described in the claims, and it is understood that the examples surely belong to the technical range of the disclosure.

For example, in the above embodiments, it is assumed that a device from which positional information of a contributing user is acquired and a device with which the contributing user generates and transmits contribution information are the same, but the present disclosure is not limited thereto. For example, a device from which positional information of a contributing user is acquired and a device with which the contributing user generates and transmits contribution information may be separate devices. In this case, it is necessary to be able to identify the correspondence of the contribution information and the positional information using identification information of the contributing user. In addition, when the device with which the contributing user generates and transmits contribution information does not generate positional information for specifying the range of activity, the device may not necessarily be a portable device. For example, a device for generating and transmitting contribution information may be an information processing device such as a PC, a home video processing device (a DVD recorder, a video cassette recorder, or the like), a home videogames device, a home appliance, or the like.

In addition, in the third embodiment, the history of e-money use is used, but the disclosure is not limited thereto. For example, the history of coupon use may be used.

Furthermore, in the present specification, the steps described in the flowcharts and the sequence diagrams, of course, are processes performed in time series along the order described, and include processes performed in parallel or individually, but are not necessarily performed in time series. In addition, it is needless to say that the order can be appropriately changed depending on cases even in steps performed in time series.

The present disclosure contains subject matter related to that disclosed in Japanese Priority Patent Application JP 2010-222862 filed in the Japan Patent Office on Sep. 30, 2010, the entire contents of which are hereby incorporated by reference.

What is claimed is:

1. An information processing device, comprising:
a range of activity information acquisition unit which acquires information of the range of activity that is an area that a user who contributes contribution information on a plurality of facility visits by the user;
and a reliability level evaluation unit, including a processor, which evaluates the level of reliability for the contribution information based on the information of the range of activity
for each of the plurality of facility visits by the user such that multiple visits by the user that meet reliability level evaluation conditions increase the level of reliability above a level of reliability for a single visit by the user that meets the reliability level evaluation conditions;
wherein the reliability level evaluation unit evaluates the level of reliability based on the reliability level evaluation conditions that include at least either a time zone designated by a contribution information providing server that provides the contribution information or the distance from the facility;
wherein the reliability level evaluation unit evaluates the level of reliability by calculating a number of times that the distance from the position indicating positional information of the user to the facility is within a designated distance in a time zone designated by the reliability level evaluation conditions using the history of the positional information of the user; and
wherein the reliability level evaluation unit increases the reliability level each of the number of times that the distance from the position indicating positional information of the user to the facility is within a designated distance in a time zone designated by the reliability level evaluation conditions using the history of the positional information of the user.

2. The information processing device according to claim 1, wherein the reliability level evaluation unit uses the information of the range of activity of the user, which is specified in advance, to evaluate the level of reliability based on whether or not the facility is within the range of activity.

3. The information processing device according to claim 2, wherein the range of activity is specified based on information indicating the section of a commuter ticket of the user.

4. The information processing device according to claim 1, wherein the reliability level evaluation unit further evaluates the level of reliability based on use history information of e-money or a coupon that the user used in the facility.

5. A contribution information evaluation system, comprising: a contribution information providing server which includes a contribution information provision control unit which provides contribution information on a plurality of facility visits by a user;
and a terminal device which contributes the contribution information,
wherein the contribution information providing server or the terminal device further includes a reliability level evaluation unit, including a processor, which evaluates a level of reliability of the contribution information based on information of a range of activity for each of the plurality of facility visits by the user such that multiple visits by the user that meet reliability level evaluation conditions increase the level of reliability above a level of reliability for a single visit by the user that meets the reliability level evaluation conditions, wherein the reliability level evaluation unit evaluates the level of reliability based on the reliability level evaluation conditions that include at least either a time zone designated by a contribution information providing server that provides the contribution information or the distance from the facility, wherein the reliability level evaluation unit evaluates the level of reliability by calculating a number of times that the distance from the position indicating positional information of the user to the facility is within a designated distance in a time zone designated by the reliability level evaluation conditions using the history of the positional information of the user, and wherein the reliability level evaluation unit increases the reliability level each of the number of times that the distance from the position indicating positional information of the user to the facility is within a designated distance in a time zone designated by the reliability level evaluation conditions using the history of the positional information of the user, and wherein the contribution information provision control unit provides the level of reliability of the contribution information together with the contribution information.

6. A contribution information evaluation method comprising:

acquiring information of a range of activity that is an area that a user who contributes contribution information on a plurality of facility visits by the user, and evaluating, using a processor, a level of reliability for the contribution information based on the information of the range of activity for each of the plurality of facility visits by the user such that multiple visits by the user that meet reliability level evaluation conditions increase the level of reliability above a level of reliability for a single visit by the user that meets the reliability level evaluation conditions, wherein the evaluating the level of reliability comprises evaluating the level of reliability based on the reliability level evaluation conditions that include at least either a time zone designated by a contribution information providing server that provides the contribution information or the distance from the facility, wherein the evaluating the level of reliability comprises evaluating the level of reliability by calculating a number of times that the distance from the position indicating positional information of the user to the facility is within a designated distance in a time zone designated by the reliability level evaluation conditions using the history of the positional information of the user, and wherein the reliability level evaluation unit increases the reliability level each of the number of times that the distance from the position indicating positional information of the user to the facility is within a designated distance in a time zone designated by the reliability level evaluation conditions using the history of the positional information of the user.

7. A non-transitory computer readable medium encoded with a program which causes a computer to perform a method comprising:

function as an information processing device including a range of activity information acquisition unit which acquires acquiring information of a range of activity that is an area that a user who contributes contribution information on a plurality of facility visits by the user, and evaluating, using a processor, a reliability level evaluation unit which evaluates the level of reliability for the contribution information based on the information of the range of activity for each of the plurality of facility visits by the user such that multiple visits by the user that meet reliability level evaluation conditions increase the level of reliability above a level of reliability for a single visit by the user that meets the reliability level evaluation conditions, wherein the evaluating the level of reliability comprises evaluating the level of reliability based on the reliability level evaluation conditions that include at least either a time zone designated by a contribution information providing server that provides the contribution information or the distance from the facility, wherein the evaluating the level of reliability comprises evaluating the level of reliability by calculating a number of times that the distance from the position indicating positional information of the user to the facility is within a designated distance in a time zone designated by the reliability level evaluation conditions using the history of the positional information of the user, and wherein the reliability level evaluation unit increases the reliability level each of the number of times that the distance from the position indicating positional information of the user to the facility is within a designated distance in a time zone designated by the reliability level evaluation conditions using the history of the positional information of the user.

8. The information processing device according to claim 1, wherein the reliability level evaluation unit calculates a first reliability level for a first user and a second reliability level for a second user having a smaller number of the plurality of facility visits than the first user such that the first reliability level is greater than the second reliability level.

* * * * *